(12) United States Patent
Troia et al.

(10) Patent No.: US 11,316,841 B2
(45) Date of Patent: Apr. 26, 2022

(54) SECURE COMMUNICATION BETWEEN AN INTERMEDIARY DEVICE AND A NETWORK

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

(*) Notice: Subject to any disclaimer, the term of this patent is extended or adjusted under 35 U.S.C. 154(b) by 348 days.

(21) Appl. No.: 16/363,533

(22) Filed: Mar. 25, 2019

(65) Prior Publication Data

US 2020/0314073 A1 Oct. 1, 2020

(51) Int. Cl.
*H04L 9/32* (2006.01)
*G06F 21/62* (2013.01)
(Continued)

(52) U.S. Cl.
CPC ........ *H04L 63/0442* (2013.01); *G06F 3/0683* (2013.01); *G06F 16/21* (2019.01); *G06F 16/242* (2019.01); *G06F 16/2452* (2019.01); *G06F 16/24535* (2019.01); *G06F 16/285* (2019.01); *H04L 9/0869* (2013.01); *H04L 9/32* (2013.01);
(Continued)

(58) Field of Classification Search
CPC ..... H04L 63/0442; H04L 9/0869; H04L 9/32; H04L 63/0876; H04L 2209/38; H04L 2209/84; H04L 63/0823; H04L 63/0869; H04L 9/3239; H04L 9/3247; H04L 9/3263; H04L 9/3297; H04L 67/1097; H04W 4/40; G06F 16/285; G06F 16/21; G06F 16/242; G06F 16/2452; G06F 16/24535; G06F 3/0683
See application file for complete search history.

(56) References Cited

U.S. PATENT DOCUMENTS 10,057,243 B1* 8/2018 Kumar ............... H04L 9/321
10,542,087 B1* 1/2020 Chopra ............. H04L 67/1097
(Continued)

FOREIGN PATENT DOCUMENTS

WO 2018-036700 A1 3/2018
WO 2019-009928 A1 1/2019

OTHER PUBLICATIONS

Hsiao, Hui-I., and Karen W. Brannon. "Secure information caching on the Web." Asia-Pacific Web Conference. Springer, Berlin, Heidelberg, 2004. (Year: 2004).*
(Continued)

*Primary Examiner* — Michael Simitoski
(74) *Attorney, Agent, or Firm* — Brooks, Cameron & Huebsch, PLLC

(57) ABSTRACT

The present disclosure includes apparatuses, methods, and systems for secure communication between an intermediary device and a network. An example apparatus includes a memory, and circuitry. The circuitry is configured to determine, in response to receipt of a request for information corresponding to a particular category, an identifier associated with the particular category. The circuitry is further configured to provide, along with a signature, the determined identifier to a network device, wherein the requested information are received in response to the signature being verified by network device.

10 Claims, 12 Drawing Sheets

(51) Int. Cl.

| | |
|---|---|
| *H04L 29/06* | (2006.01) |
| *H04L 9/08* | (2006.01) |
| *G06F 16/2452* | (2019.01) |
| *G06F 16/28* | (2019.01) |
| *G06F 3/06* | (2006.01) |
| *G06F 16/21* | (2019.01) |
| *G06F 16/242* | (2019.01) |
| *G06F 16/2453* | (2019.01) |
| *H04L 67/1097* | (2022.01) |
| *G06F 16/27* | (2019.01) |

(52) U.S. Cl.
CPC ......... *H04L 9/3239* (2013.01); *H04L 9/3247* (2013.01); *H04L 9/3263* (2013.01); *H04L 9/3297* (2013.01); *H04L 63/0876* (2013.01); *H04L 67/1097* (2013.01)

(56) References Cited

U.S. PATENT DOCUMENTS

| | | | | |
|---|---|---|---|---|
| 10,615,970 | B1* | 4/2020 | Griffin | H04L 9/0825 |
| 2011/0199989 | A1* | 8/2011 | Wietfeldt | H04W 72/1215 |
| | | | | 370/329 |
| 2012/0047164 | A1* | 2/2012 | Saadat | G06F 16/24542 |
| | | | | 707/769 |
| 2015/0135327 | A1* | 5/2015 | Wall | G06F 21/6218 |
| | | | | 726/26 |
| 2016/0210470 | A1* | 7/2016 | Rozenberg | G06F 16/2471 |
| 2017/0104580 | A1 | 4/2017 | Wooten et al. | |
| 2018/0137298 | A1 | 5/2018 | Hildreth et al. | |
| 2019/0005470 | A1 | 1/2019 | Uhr et al. | |
| 2019/0281066 | A1* | 9/2019 | Simons | H04L 9/3239 |
| 2020/0021431 | A1* | 1/2020 | Mondello | G07C 5/008 |
| 2020/0110811 | A1* | 4/2020 | Kamijoh | H04L 63/126 |
| 2020/0117729 | A1* | 4/2020 | Raman | G06F 16/2358 |
| 2020/0134206 | A1* | 4/2020 | Thekadath | H04L 9/3297 |
| 2020/0294100 | A1* | 9/2020 | Yang | G06Q 20/0658 |

OTHER PUBLICATIONS

International Search Report and Written Opinion from related International Application No. PCT/US2020/020930, dated Jul. 2, 2020, 16 pages.

U.S. Appl. No. 15/853,498, entitled, "Physical Unclonable Function Using Message Authentication Code", filed Dec. 22, 2017, 28 pages.

U.S. Appl. No. 16/201,652, entitled, "Parking Infrastructure Powered by a Decentralized, Distributed Database", filed Nov. 27, 2018, 27 pages.

U.S. Appl. No. 15/993,119, entitled, "Transmission of Vehicle Route Information by Passage Devices", filed May 30, 2018, 25 pages.

U.S. Appl. No. 16/034,763, entitled, "Secure Vehicular Communication", filed Jul. 13, 2018, 37 pages.

U.S. Appl. No. 16/034,809, entitled, "Secure Vehicular Services Communication", filed Jul. 13, 2018, 36 pages.

PCT International Application No. PCT/IB2019/000089, entitled, "Method for Improving Safety of a Component or System Running a Firmware or a Finite State Machine", filed Feb. 22, 2019, 42 pages.

* cited by examiner

1

SECURE COMMUNICATION BETWEEN AN INTERMEDIARY DEVICE AND A NETWORK

TECHNICAL FIELD

The present disclosure relates generally to semiconductor memory and methods, and more particularly, to secure communication between an intermediary device and a network.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the data stored in the memory cells of a memory device. Such threats can include, for example, faults occurring in the memory device, and/or threats from hackers or other malicious users. Such threats can cause significant financial loss, and/or can present significant safety and/or security issues.

DETAILED DESCRIPTION

Figure 1:
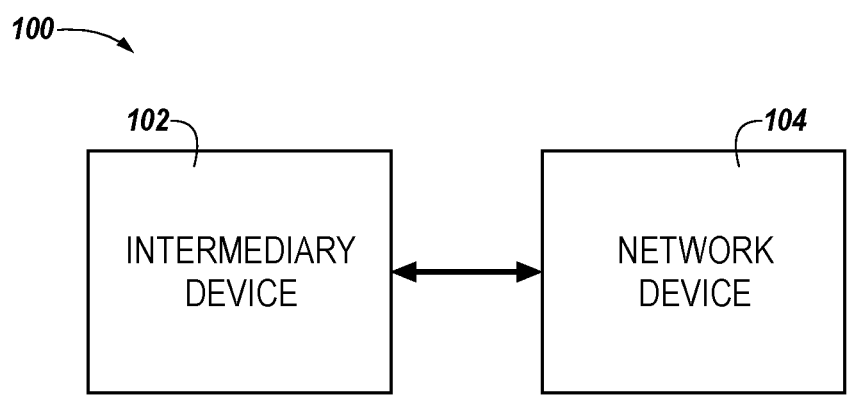
FIG. 1 illustrates a block diagram of a system including an intermediary device and a network device in accordance with an embodiment of the present disclosure.

The present disclosure includes apparatuses, methods, and systems for secure communication between an intermediary device and a network. An example apparatus includes a memory, and circuitry. The circuitry is configured to determine, in response to receipt of a request for information corresponding to a particular category, an identifier associated with the particular category. The circuitry is further configured to provide, along with a signature, the determined identifier to a network device, wherein the requested information are received in response to the signature being verified by network device.

Various communication technologies can be employed in retrieving data corresponding to particular information from a database. In some examples, due to a nature of a structural complexity of the database and a necessity of the particular information to be retrieved in a timely manner, those communication technologies utilized for retrieving the information from the database may lack mechanisms of securely communicating the information despite of the necessity of the security. For example, the information being retrieved from the database may be intercepted and/or manipulated by a hacker or other entities in order to change the information, repeat requests for the information to gain unauthorized access to the emergency vehicle or other vehicles, etc.

Accordingly, embodiments of the present disclosure provides benefits such as making sure that information being communicated with the database are from an authorized entity and/or provided to authorized requesters. The embodiments of the present disclosure, therefore, result in secure communication with the database while maintaining a degree of performance in satisfying those requests for information in a timely manner.

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 201 may reference element "01" in FIG. 2, and a similar element may be referenced as 301 in FIG. 3.

FIG. 1 illustrates a block diagram of a system 100 including an intermediary device 102 and a network device 104 in accordance with an embodiment of the present disclosure. The intermediary device 102 and/or network device 104 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Figure 4A:
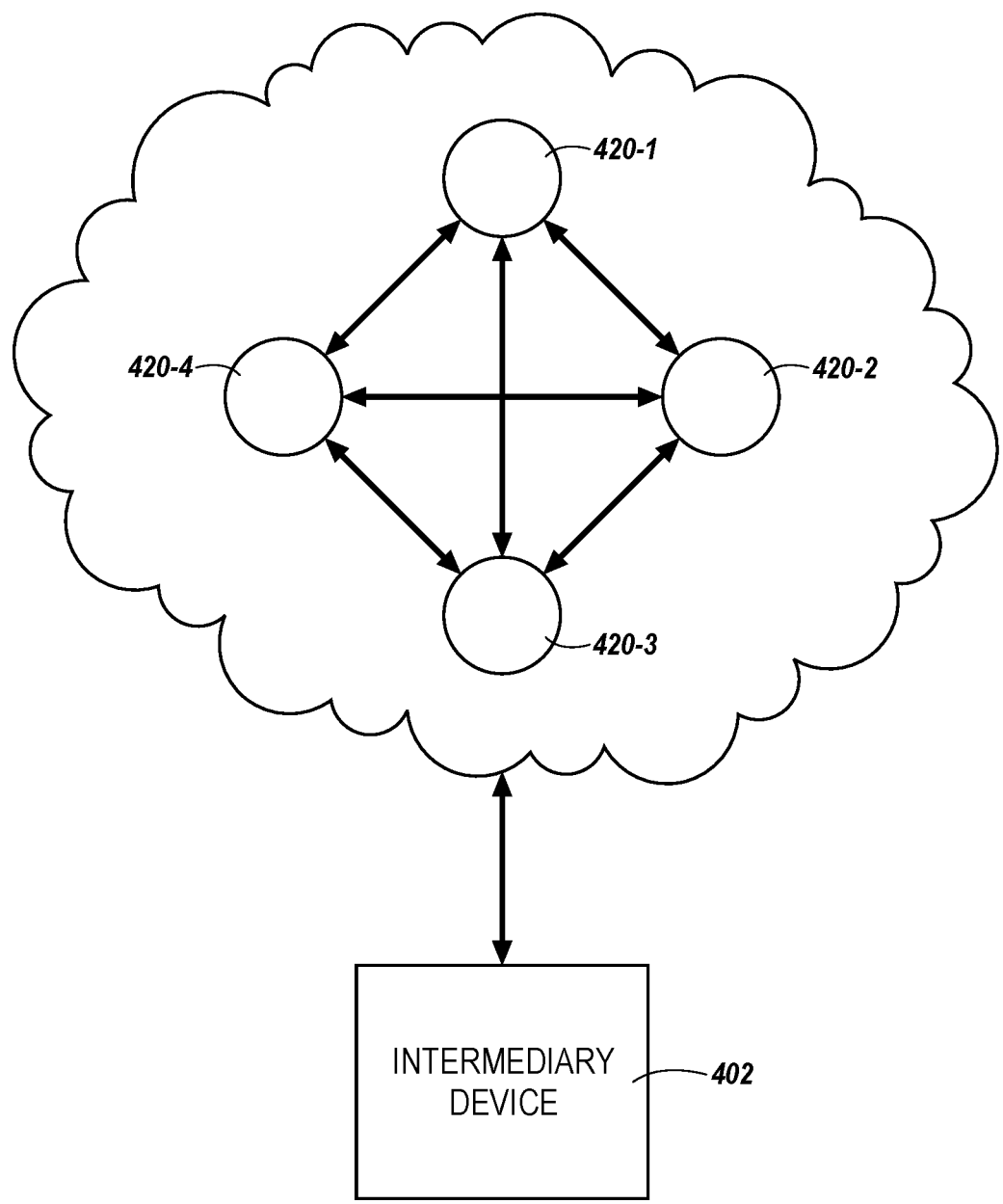
FIG. 4A illustrates a block diagram of a network including nodes and an intermediary device coupled to the network in accordance with an embodiment of the present disclosure.

The network device 104 may be a device for storing information that can be retrieved by the intermediary device 102. In some examples, the network device 104 can be configured to as a node of a network including multiple nodes. As an example, the network device 104 can be a node of a network that supports a distributed ledger technology (DLT) such as "block chain" technology. A distributed ledger is a database that is spread over several nodes or computing devices, and block chain (e.g., continuously growing encrypted list of records) is one form a DLT in which multiple nodes (nodes 420 as described in connection with FIG. 4A) can share and store the distributed list of records in a peer to peer network manner. Further details of block chain network are described in connection with FIG. 4.

Various information associated with transactions can be recorded into the network device 104. As used herein, a transaction can refer to an exchange occurred among partiers (e.g., one or more parties). The transaction can involve various forms of exchanges. In one example, the information that can be exchanged among parties may include vehicular information, such as vehicular identification numbers (VINs) and/or license plate combinations (e.g., letters and/or numbers) that can be utilized to identify respective vehicles, a route a particular vehicle has taken for a single trip (e.g., a route an emergency vehicle has taken for a single dispatch), a station that a particular emergency vehicle belongs to, and/or a date and/or a time a particular emergency vehicle has dispatched. In another example, the exchange can be a monetary exchange including information such as a sender (e.g., or buyer), a receiver (e.g., or seller), an amount of money exchanged between the sender and the receiver, a date at which the exchange has occurred.

The intermediary device 102 is capable of communicating with the network device 104 and can perform various operations (e.g., as indexer and/or query device) associated with the information stored in the network device 104. In one example, the intermediary device 102 can be configured to, as an indexer, organize (e.g., index) information stored in the network device 104 according to various categories. For example, the intermediary device 102 can be configured to index senders identifiable from multiple (e.g., all) transactions into a same category (e.g., sender category). Similarly, buyers, data of transactions, a subject matter being exchanged, etc. can be indexed into a respective category. In this way, embodiments of the present disclosure can provide benefits of timely complying with requests for those information that may be distributed over multiple transactions. In another example, the intermediary device 102 can be configured to, as a query device, identify those nodes/devices (e.g., network devices such as network device 104) storing requested information and retrieve the requested information from the nodes/devices. Further details of utilizing intermediary device 102 as a query device/indexer are described in connection with FIGS. 4-5.

Figure 2:
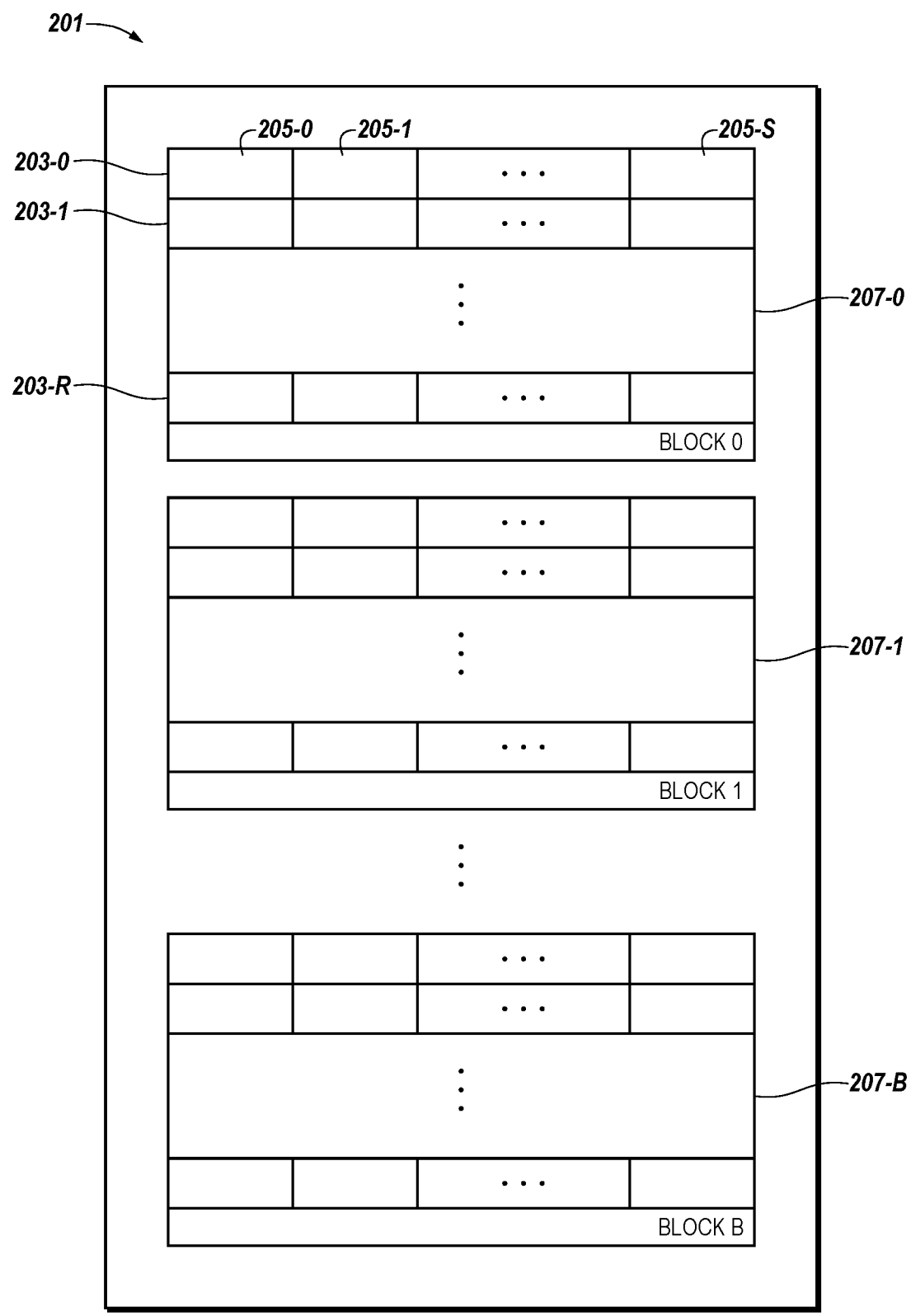
FIG. 2 illustrates a diagram of a portion of a memory array having a number of physical blocks in accordance with an embodiment of the present disclosure.

FIG. 2 illustrates a diagram of a portion of a memory array 201 having a number of physical blocks in accordance with an embodiment of the present disclosure. Memory array 201 can be, for example, a flash memory array such as a NAND flash memory array. As an additional example, memory array 201 can be a resistance variable memory array such as a PCRAM, RRAM, MMRAM, or spin torque transfer (STT) array, among others. However, embodiments of the present disclosure are not limited to a particular type of memory array. Further, memory array 201 can be a secure memory array, as will be further described herein. Further, although not shown in FIG. 2, memory array 201 can be located on a particular semiconductor die along with various peripheral circuitry associated with the operation thereof.

As shown in FIG. 2, memory array 201 has a number of physical blocks 207-0 (BLOCK 0), 207-1 (BLOCK 1), . . . , 207-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 201 may be 128 blocks, 512 blocks, or 1,024 blocks, but embodiments are not limited to a particular power of two or to any particular number of physical blocks in memory array 201.

A number of physical blocks of memory cells (e.g., blocks 207-0, 207-1, . . . , 207-B) can be included in a plane of memory cells, and a number of planes of memory cells can be included on a die. For instance, in the example shown in FIG. 2, each physical block 207-0, 207-1, . . . , 207-B can be part of a single die. That is, the portion of memory array 201 illustrated in FIG. 2 can be a die of memory cells.

As shown in FIG. 2, each physical block 207-0, 207-1, . . . , 207-B includes a number of physical rows (e.g., 203-0, 203-1, . . . , 203-R) of memory cells coupled to access lines (e.g., word lines). The number of rows (e.g., word lines) in each physical block can be 32, but embodiments are not limited to a particular number of rows 203-0, 203-1, . . . , 203-R per physical block. Further, although not shown in FIG. 2, the memory cells can be coupled to columns of sense lines (e.g., data lines and/or digit lines).

As one of ordinary skill in the art will appreciate, each row 203-0, 203-1, . . . , 203-R can include a number of pages of memory cells (e.g., physical pages). A physical page refers to a unit of programming and/or sensing (e.g., a number of memory cells that are programmed and/or sensed together as a functional group). In the embodiment shown in FIG. 2, each row 203-0, 203-1, . . . , 203-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 2, a page of memory cells can comprise a number of physical sectors 205-0, 205-1, . . . , 205-S (e.g., subsets of memory cells). Each physical sector 205-0, 205-1, . . . , 205-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 205-0, 205-1, . . . , 205-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 207-0, 207-1, . . . , 207-B, rows 203-0, 203-1, . . . , 203-R, sectors 205-0, 205-1, . . . , 205-S, and pages are possible. For example, rows 203-0, 203-1, . . . , 203-R of physical blocks 207-0, 207-1, . . . , 207-B can each store data corresponding to a single logical sector which can include, for example, more or less than 512 bytes of data.

Figure 3:
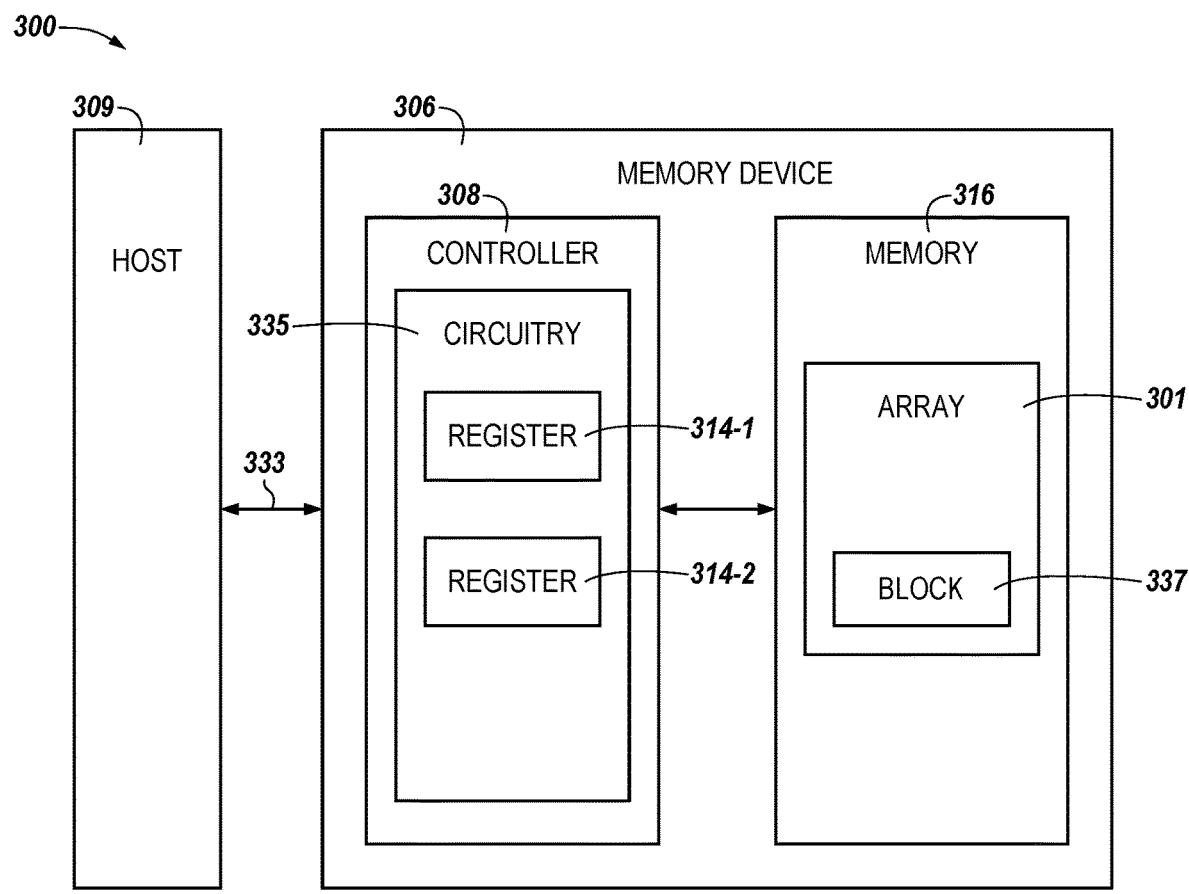
FIG. 3 is a block diagram of a computing system including an apparatus in the form of a memory device that is communicable with a host and/or a different memory device in accordance with an embodiment of the present disclosure.

FIG. 3 is a block diagram of a computing system 200 including an apparatus in the form of a memory device 306 that is communicable with a host and/or a different memory device in accordance with an embodiment of the present disclosure. Host 309 and memory device 306 may be analogous to intermediary device 102 and/or network device 104, respectively, as described in connection with FIG. 1. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 306.

In the embodiment illustrated in FIG. 3, memory device 306 can include a memory 316 having a memory array 301. Memory array 301 can be analogous to memory array 301 previously described in connection with FIG. 2. Further, memory array 301 can be a secure array, as will be further described herein. Although one memory array 301 is illustrated in FIG. 3, memory 316 can include any number of memory arrays analogous to memory array 301.

As illustrated in FIG. 3, host/memory device 309 can be coupled to the memory device 306 via interface 333. Host/memory device 309 and memory device 306 can communicate (e.g., send commands and/or data) on interface 333. Host/memory device 309 and/or memory device 306 can be, or be part of, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, among other host systems, and can include a memory access device (e.g., a processor). One of ordinary skill in the art will appreciate that "a processor" can intend one or more processors, such as a parallel processing system, a number of coprocessors, etc.

Interface 333 can be utilized for wired and/or wireless communication between host/memory device 309 and memory device 306. In one example, interface 333 can be in the form of a standardized physical interface. For example, when memory device 306 is used for information storage in computing system 200, interface 333 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 333 can provide an interface for passing control, address, information (e.g., data), and other signals between memory device 306 and a host/memory device 309 having compatible receptors for interface 333.

In another example, interface 333 can be an interface utilized for a wireless communication technology, such as different generations of broadband mobile telecommunication technologies (e.g., 1-5G), device-to-device to communication including Bluetooth, Zigbee, 1-5G and/or long-term evolution (LTE) device-to-device communication technologies, and/or other wireless communication utilizing another device (e.g., WiFi utilizing an access point AP) may be utilized in communicating with different entities.

Memory device 306 includes controller 308 to communicate with host/memory device 309 and with memory 316 (e.g., memory array 301). For instance, controller 308 can send commands to perform operations on memory array 301, including operations to sense (e.g., read), program (e.g., write), move, and/or erase data, among other operations.

Controller 308 can be included on the same physical device (e.g., the same die) as memory 316. Alternatively, controller 308 can be included on a separate physical device that is communicatively coupled to the physical device that includes memory 316. In an embodiment, components of controller 308 can be spread across multiple physical devices (e.g., some components on the same die as the memory, and some components on a different die, module, or board) as a distributed controller.

Host/memory device 309 can include a host controller (not shown FIG. 3) to communicate with memory device 306. The host controller can send commands to memory device 306 via interface 333. The host controller can communicate with memory device 306 and/or the controller 308 on the memory device 306 to read, write, and/or erase data, among other operations. Further, in an embodiment, host/memory device 309 can be an IoT enabled device, as previously described herein, having IoT communication capabilities.

Controller 308 on memory device 306 and/or the host controller on host/memory device 309 can include control circuitry and/or logic (e.g., hardware and firmware). In an embodiment, controller 308 on memory device 306 and/or the host controller on host/memory device 309 can be an application specific integrated circuit (ASIC) coupled to a printed circuit board including a physical interface. Also, memory device 306 and/or host/memory device 309 can include a buffer of volatile and/or non-volatile memory and a number of registers.

As shown in FIG. 3, memory device can include circuitry 335. In the embodiment illustrated in FIG. 3, circuitry 335 is included in controller 308. However, embodiments of the present disclosure are not so limited. For instance, in an embodiment, circuitry 335 may be included in (e.g., on the same die as) memory 316 (e.g., instead of in controller 308). Circuitry 335 can comprise, for instance, hardware, firmware, and/or software.

In an embodiment, circuitry 335 can divide the data stored in memory array 301 into a plurality of segments, and associate a different cryptographic hash with each respective segment. For instance, circuitry 335 can generate (e.g., calculate) a different cryptographic hash for each respective segment, using authenticated (e.g., secured) and antireplay protected commands received from host/memory device 309 (e.g., so that only memory device 306 knows these cryptographic hashes, and only memory device 306 is capable of generating and updating them). The cryptographic hash generated for each respective segment may be referred to herein as a golden hash for that segment, and can comprise, for instance, a SHA-256 cryptographic hash. These golden hashes may be stored in a particular location (e.g., register) of circuitry 335 that is inaccessible to a user of memory device 306 and/or host/memory device 309 (e.g., in a "hidden" region of memory device 306), and may be used during the process of validating the data stored in memory array 301, as will be further described herein.

Each segment defined by the circuitry 335 may correspond to a block (e.g., block 337) of a block chain, and the plurality of segments defined by the circuitry 335 may correspond to a block chain. Accordingly, a block chain can be stored in memory array 301. A block chain within memory array 301 may be an index block chain such as index block chain 120, as previously described in connection with FIG. 1. However, embodiments are not so limited. As an example, a block chain within memory array 301 may be a global block chain such as global block chain 110, as previously described in connection with FIG. 1.

A block can include a header, a cryptographic hash of a previous block, a crypto graphic hash of data stored in a block, and a digital signature.

The cryptographic hash of the data stored in memory array 301 can be generated (e.g., calculated), for example, by circuitry 335. In such an example, the cryptographic hash of the data stored can be internally generated by memory device 306 without having external data moving on interface 333. As an additional example, the cryptographic hash of the data can be communicated from an external entity. For instance, host/memory device 309 can generate the cryptographic hash of the data stored in memory array 301, and send the generated cryptographic hash to memory device 306 (e.g., circuitry 335 can receive the cryptographic hash of the data stored in memory array 301 from host/memory device 309).

The digital signature associated with the block 337 can be generated (e.g., calculated), for example, by circuitry 335 based on (e.g., responsive to) an external command, such as a command received from host/memory device 309. For instance, the digital signature can be generated using symmetric or asymmetric cryptography. As an additional example, host/memory device 309 can generate the digital signature and send (e.g. provide) the generated digital signature to memory device 306 (e.g., circuitry 335 can receive the digital signature from host/memory device 309).

Blocks of a block chain including block 337 can be stored in a secure array of memory array 301. In such an embodiment, a pair of non-volatile registers can be used to define the secure array. For example, in the embodiment illustrated in FIG. 3, circuitry 335 includes registers 314-1 and 314-2 that can be used to define the secure array. For instance, register 314-1 can define the address (e.g., the starting LBA of the data) of the secure array, and register 314-2 can define the size (e.g., the ending LBA of the data) of the secure array. An example of such registers, and their use in defining a secure array, will be further described herein (e.g., in connection with FIGS. 6A-6B). Once the secure array has been defined, circuitry 335 can generate (e.g., calculate) a cryptographic hash associated with the secure array, which may be referred to herein as a golden hash, using authenticated and antireplay protected commands (e.g., so that only memory device 306 knows the golden hash, and only memory device 306 is capable of generating and updating it). The golden hash may be stored in inaccessible portion of memory array 301 (e.g., the same inaccessible portion in which block 337 is stored), and can be used during the process of validating the data of the secure array, as will be further described herein.

Circuitry 335 can validate (e.g., during a power-on) the data stored in each respective one of a first number of the plurality of segments using the golden hash associated with that respective segment. As used herein, validating the data can include, and/or refer to, authenticating and/or attesting that the data is genuine (e.g., is the same as originally programmed), and has not been altered by hacking activity or other unauthorized changes.

For example, circuitry 335 can generate (e.g., calculate) a different run-time cryptographic hash for the data stored in each respective one of the first number of segments, and compare the run-time cryptographic hash generated for the data stored in each respective segment to the golden hash previously generated (e.g., and stored in registers in circuitry 335). Upon the comparison indicating the run-time cryptographic hash generated for the data stored in a respective segment matches the golden hash for that respective segment, it can be determined that the data stored in that respective segment has not been altered, and therefore the data stored in that respective segment can be validated (e.g., can be determined to be valid). As such, the data stored in each respective segment can be validated independently of the data stored in the other segments.

If the comparison, however, indicates the run-time cryptographic hash generated for the data stored in a respective segment does not match the golden hash for that respective segment, this may indicate that the data stored in that respective segment has been changed (e.g., due to a hacker or a fault in the memory), and therefore the data stored in that respective segment may not be valid (e.g., may be determined to not be valid). In such an instance, circuitry 335 can remediate (e.g., attempt to remediate) the data stored in that segment. Remediating the data stored in the segment can include, for instance, determining whether remediation of the data is allowed, and, if remediation is allowed, recovering (e.g., restoring) the data from memory 316 (e.g., from a remediation block included in the memory, such as remediation block 1260 further described in connection with FIG. 12).

Memory device 306 (e.g., circuitry 335) can send, via interface 333, the block 337, along with the digital signature associated with block 337, to host/memory device 309 for validation of the data stored in memory array 301. For example, circuitry 335 can sense (e.g., read) the block 337 stored in memory array 301, and send the sensed block to host/memory device 309 for validation of the data stored in array 301, responsive to a powering (e.g., a powering on and/or powering up) of memory device 306. As such, a validation of the data stored in memory array 301 can be initiated (e.g., automatically) upon the powering of memory device 306.

As an additional example, circuitry 335 can send the block 337, along with the digital signature associated with block 337, to host/memory device 309 upon an external entity, such as host/memory device 309, initiating a validation of the data stored in memory array 301. For instance, host/memory device 309 can send a command to memory device 306 (e.g., circuitry 335) to sense the block 337, and circuitry 335 can execute the command to sense the block 337, and send the sensed block to host/memory device 309 for validation of the data stored in array 301, responsive to receipt of the command.

Upon receiving the block 337, host/memory device 309 can validate (e.g., determine whether to validate) the data stored in memory array 301 using the received block. For example, host/memory device 309 can use the cryptographic hash of the previous block in the block chain and the cryptographic hash of the data stored in memory array 301 to validate the data. Further, host/memory device 309 can validate the digital signature associated with the block 337 to determine the block is included (e.g., is eligible to be included) in the block chain. As used herein, validating the data stored in memory array 301 can include, and/or refer to, authenticating and/or attesting that the data is genuine (e.g., is the same as originally programmed), and has not been altered by hacking activity or other unauthorized changes.

In embodiments in which memory array 301 is a secure array, the golden hash previously described herein may also be used to validate the data stored in memory array 301. For example, a run-time cryptographic hash can be generated (e.g., calculated), and compared with the golden hash. If the comparison indicates the run-time and golden hashes match, it can be determined that the secure array has not been altered, and therefore the data stored therein is valid. If, however, the comparison indicates the run-time and golden hashes do not match, this may indicate that the data stored in the secure array has been changed (e.g., due to a hacker or a fault in the memory), and this can be reported to host/memory device 309.

After the validation of the data stored in memory array 301, circuitry 335 can generate an additional (e.g., the next) block in the block chain for validating the data stored in memory array 301, in a manner analogous to which the block 337 was generated. For example, this additional block can include a cryptographic hash of block 337, which has now become the previous block in the block chain, and a new cryptographic hash of the data stored in memory array 301. Further, this additional block can include a header having a timestamp indicating when this block was generated, and can have a digital signature associated therewith that indicates this block is included in the block chain. An example illustrating such an additional block will be further described herein (e.g., in connection with FIG. 3). Further, in embodiments in which memory array 301 is a secure array, an additional (e.g., new) golden hash can be generated.

The additional block, as well as the digital signature associated with the additional block, and the additional golden hash, can be stored in memory array 301. For example, the additional block can replace block 337 (e.g., the previous block) in memory array 301. The additional block, digital signature, and additional golden hash can then be used by host/memory device 309 to validate the data stored in memory array 301, in a manner analogous to that previously described herein for block 337. Additional blocks in the block chain can continue to be generated by circuitry 335, and used by host/memory device 309 to validate the data stored in memory array 301, in such manner throughout the lifetime of memory device 306.

The embodiment illustrated in FIG. 3 can include additional circuitry, logic, and/or components not illustrated so as not to obscure embodiments of the present disclosure. For example, memory device 306 can include address circuitry to latch address signals provided over I/O connectors through I/O circuitry. Address signals can be received and decoded by a row decoder and a column decoder, to access memory array 301. Further, memory device 306 can include a main memory, such as, for instance, a DRAM or SDRAM, that is separate from and/or in addition to memory array 301. An example further illustrating additional circuitry, logic, and/or components of memory device 306 will be further described herein (e.g., in connection with FIG. 12).

FIG. 4 illustrates a block diagram of an example block chain network 410 including nodes and an intermediary device 402 coupled to the block chain network in accordance with an embodiment of the present disclosure. Although the network 410 illustrated in FIG. 4 includes four nodes such as 420-1, 420-2, 420-3, and 420-4 (collectively referred to as nodes 420), embodiments are not limited to a particular quantity of nodes the network 410 can include.

The network 410 can support a distributed ledger technology (DLT) such as "block chain" technology. A "block chain" is a continuously growing, encrypted list of records. Block chain is one form of a DLT in which multiple nodes (e.g., nodes 420) can share and store the distributed list of records in a peer to peer network manner. As described herein a "block" in block chain is collection of information, e.g., data, headers, transactions, encryption, etc. A block may be added to the growing list of records in the ledger if it is validated. Blocks are added to the block chain ledger in chronological order.

A distributed ledger is a database that is spread over several nodes or computing devices (e.g., nodes 420). As an example, a given node (e.g., one or more nodes 420) may maintain a copy of a current list or records in ledger. The nodes 420 may each represent a different host (e.g., computing device with processing resources. For ease of illustration, the host or nodes (e.g., nodes 420) may be considered in relation to a block chain for autonomous and/or non-autonomous transportation vehicles, cars, buses, emergency vehicles, etc. Embodiments, however, are not limited to this example.

Various wireless communication technologies can be utilized in communicating with different nodes 420 (and/or between network 410 and intermediary device 402). For example, different generations of broadband mobile telecommunication technologies (e.g., first through fifth generation (1-5G)), device-to-device (e.g., vehicle to vehicle (v2v)), to communication including Bluetooth, Zigbee, and/or LTE device-to-device communication technologies, and/or other wireless communication utilizing an intermediary devices (e.g., WiFi utilizing an access point (AP)) may be utilized in communicating with different nodes.

In an example, network device 104 illustrated in described in connection with FIG. 1 can be configured as at least one of nodes 420 of network 410. Network devices of nodes 420 can perform secure communication among nodes and/or with intermediary device 402 to add/modify data stored in the network devices. Secure communication can be performed in various ways (e.g., both at a device-level and a network-level). In one example for the device-level verification, data being communicated among nodes 420 and/or with intermediary device 402 can be discarded/denied until identities of data transmitter (e.g., one of nodes 420 and/or intermediary device 402 transmitting data to other nodes 420 and/or intermediary device 402) and/or data themselves are verified. As described herein, various mechanisms can be utilized for the verification. For example, the verification can be performed using a certificate (e.g., 881 and/or 982) provided from a transmitter (e.g., as described in connection with FIG. 10) and/or using a signature included within the data (e.g., as described in connection with FIGS. 4B and/or 11). In another example for the device-level verification, data being communicated among nodes 420 and/or with intermediary device 102 can be provided as encrypted, as further described in connection with FIGS. 8 and 9. As an example for the network-level verification, each network device may communicate with other network devices configured as other nodes for performing, for instance, Merkle-Tree validation.

Each network device being configured as at least a portion of the nodes 420 can include a firmware to perform functions of device-level and/or network-level verifications. In one embodiment, an individual network device may be configured to perform both device-level and network-level verifications. In another example, while a first network device may be configured to perform a device-level verification, a second network device (e.g., bridge controller) coupled to the first network device can be configured to communicate with other nodes and perform a network-level verification (e.g., as well as device-level verification) in lieu of the first network device. In this example, having two different network devices that are both configured to perform the device-level verification can provide benefits such as further strengthening security of the communication by performing the device-level verification twice. In an example, either first and/or second network device can be configured and act as a node (e.g., nodes 420) of the network 410.

The intermediary device 402 coupled to the network 410 can operate as an indexer and/or query device. In one example, as an indexer, the intermediary device 402 can be configured to organize information of transactions (e.g., that are chronologically organized among the nodes 420) in a manner that makes retrieval of the particular information (e.g., that may be stored over multiple transactions and/or nodes 420) more efficient. As an example, the intermediary device 402 can be configured to assign, to each information stored in a transaction, a corresponding identifier that indicates which category the information are subject to.

In another example, as an query device, the intermediary device 402 can be configured to receive a request for particular information stored in the network 410 and retrieve the particular information from the network 410 in a secure manner. The intermediary device 402 as a query device can be a programmable silicon device that is capable of performing high-speed symbolic pattern matching, which allows comprehensive search and analysis of complex and/or unstructured database (e.g., network 410). In an example in which information stored in transactions are assigned respective identifiers, the intermediary device 402 can be configured to retrieve information using an identifier assigned to the information. Further details of utilizing intermediary device 402 as indexer/query device are described below.

Figure 4B:
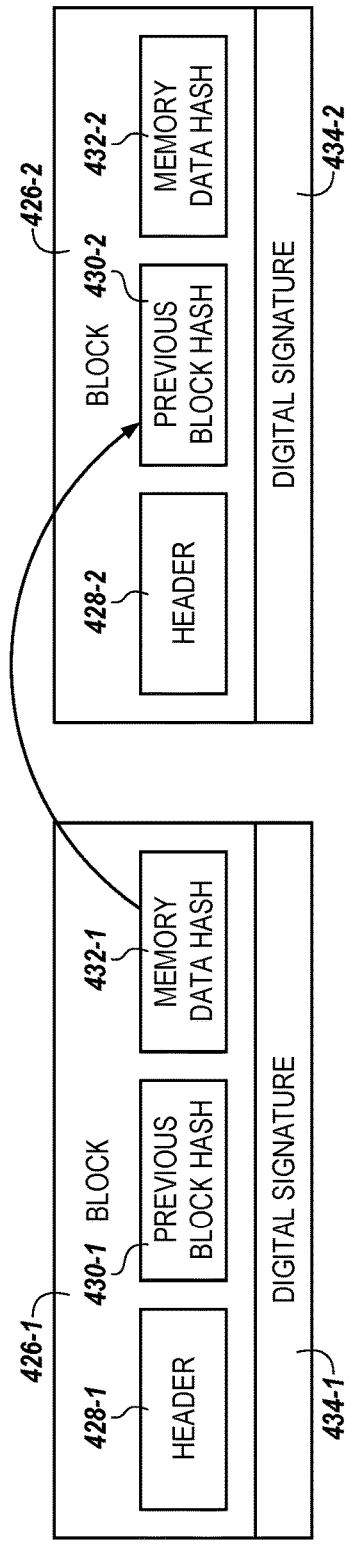
FIG. 4B illustrates examples of blocks that can be used in a block chain for indexing data in a block chain in accordance with an embodiment of the present disclosure.

FIG. 4B illustrates examples of blocks (e.g., block 426-1 and block 426-2) that can be used in a block chain for indexing data in a block chain (e.g. in memory array 301 previously described in connection with FIG. 3) in accordance with an embodiment of the present disclosure. Blocks 426-1 and 426-2 can be generated, for instance, using circuitry 310 previously described in connection with FIG. 3. For example, block 426-2 can be generated after block 426-1 has been used to validate the data stored in the memory (e.g., block 426-2 can be the next block in the block chain after block 426-1).

As shown in FIG. 4B, each respective block 426-1 and 426-2 can include a header, a cryptographic hash of the previous block in the block chain, and a cryptographic hash of the data stored in the memory, in a manner analogous to block 337 previously described in connection with FIG. 3. For example, block 426-1 includes header 428-1 having a timestamp indicating when block 426-1 was generated, cryptographic hash 430-1 of the previous block in the block chain, and cryptographic hash 432-1 of the data stored in the memory. Further, block 426-2 includes header 428-2 having a timestamp indicating when block 426-2 was generated, cryptographic hash 430-2 of the previous block (e.g., block 426-1) in the block chain, and a subsequent (e.g., new) cryptographic hash 432-2 of the data stored in the memory.

As shown in FIG. 4B, cryptographic hash 432-1 of block 426-1 can be used as cryptographic hash 430-2 of block 426-2. That is, block 426-2 can include cryptographic hash 432-1 of the data stored in the memory from block 426-1 as cryptographic hash 430-2 of the previous block in the block chain.

As shown in FIG. 4B, each respective block 426-1 and 426-2 can have a digital signature (e.g., digital signature 434-1 and 434-2, respectively) associated therewith that indicates the block is included in the block chain, in a manner analogous to block 337 previously described in connection with FIG. 3. For example, digital signature 434-1 is associated with block 426-1, and digital signature 434-2 is associated with block 426-2. Although not illustrated in FIG. 4B, each block 426 can also include transaction such as transactions 427 illustrated in FIG. 4C.

Figure 4C:
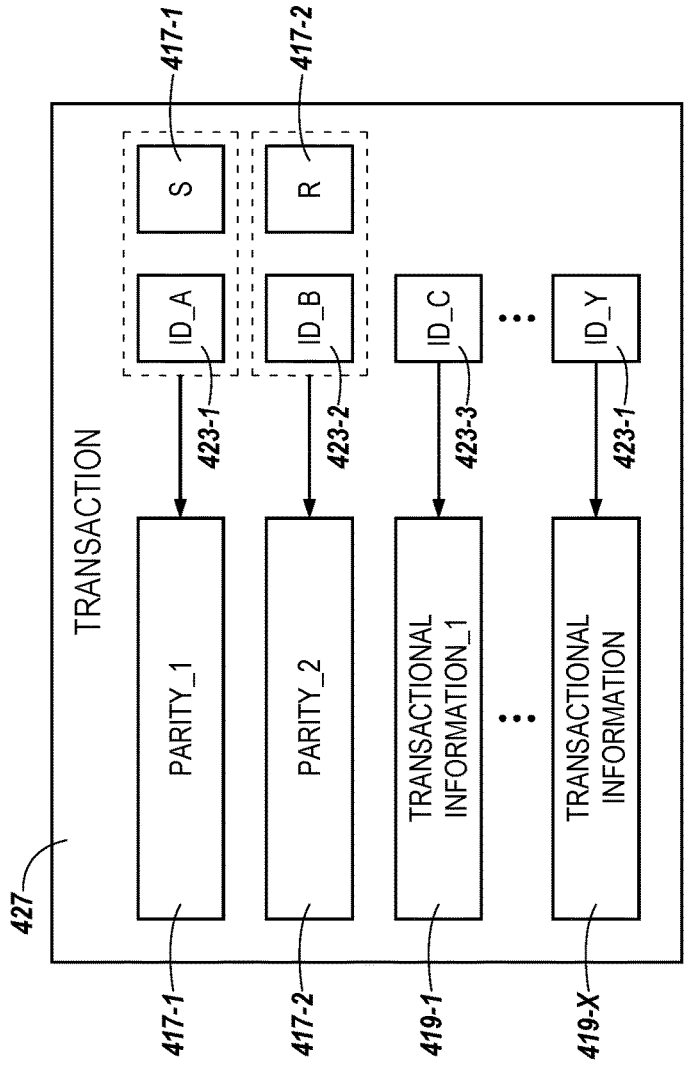
FIG. 4C illustrates a block diagram of an example transaction stored in a block and having information and identifier assigned to each information in accordance with an embodiment of the present disclosure.

FIG. 4C illustrates a block diagram of an example transaction stored in a block and having information and identifier assigned to each information in accordance with an embodiment of the present disclosure. The transaction 427 may be stored in a block that is analogous to block 426-1 and/or 426-2, as described in connection with FIG. 4B.

As shown in FIG. 4C, the transaction 427 includes various information such as parties (e.g., parties 417-1 (e.g., party_1) and 417-2 (party_2)) associated with the transaction 427 and transactional information 419-1, ..., 419-X. Although two parties are described as being included in the transaction 427, embodiments are not limited to a quantity of parties being associated with and/or included in the transaction 427. As described in connection with FIG. 1, the parties 417-1 and 417-2 may be a sender and a receiver, respectively. As an example, in a monetary transaction, the party 417-1 may be a payor and the party 417-2 may be a payee of the transaction. Example transactional information (e.g., transactional information 419-1, ..., 419-X) can include vehicular identification numbers (VINs) and/or license plate combinations (e.g., letters and/or numbers) that can be utilized to identify respective vehicles, a route a particular vehicle has taken for a single trip (e.g., a route an emergency vehicle has taken for a single dispatch), a station that a particular emergency vehicle belongs to, and/or a date, a time a particular emergency vehicle has dispatched, an amount of money exchanged between the sender and the receiver, a date at which the exchange has occurred, as previously described in connection with FIG. 1.

In some examples, parties (e.g., parties 417-1 and 417-2) can be assigned a same identifier. In this example, a sender (e.g., payor) and a receiver (e.g., payee) may be respectively identified by a flag assigned to each party. For example, as illustrated in FIG. 4C, the party 417-1 is assigned a flag "S" indicating that the party 417-1 is a sender, and the party 417-2 is assigned a flag "R" indicating that the party 417-2 is a receiver.

Each identifier (e.g., identifiers 423) can be utilized to identify a respective category each information is subject to. As further described in connection with FIG. 6, the identifiers can be associated with one another. Associating identifiers with one another can be utilized to retrieve information associated with multiple categories. As an example, an intermediary device (e.g., intermediary device 402) can receive a request to retrieve information associated with "a buyer who purchased a particular product during a particular period" and/or "extract all the models, the brand and data of certification of any vehicle using a certain release of firmware" that corresponds to multiple categories, such as a party characteristic (e.g., receiver and/or sender), a product associated with transactions, a data on which each transaction occurred, etc. In this example, the intermediary device can provide those identifiers associated with multiple information to nodes (e.g., nodes 420) of a network (e.g., network 410) such that particular information corresponding to the multiple categories can identified based on the provided identifiers. Further details of using identifiers for retrieving information are described in connection with FIG. 5.

Figures 5, 6A:
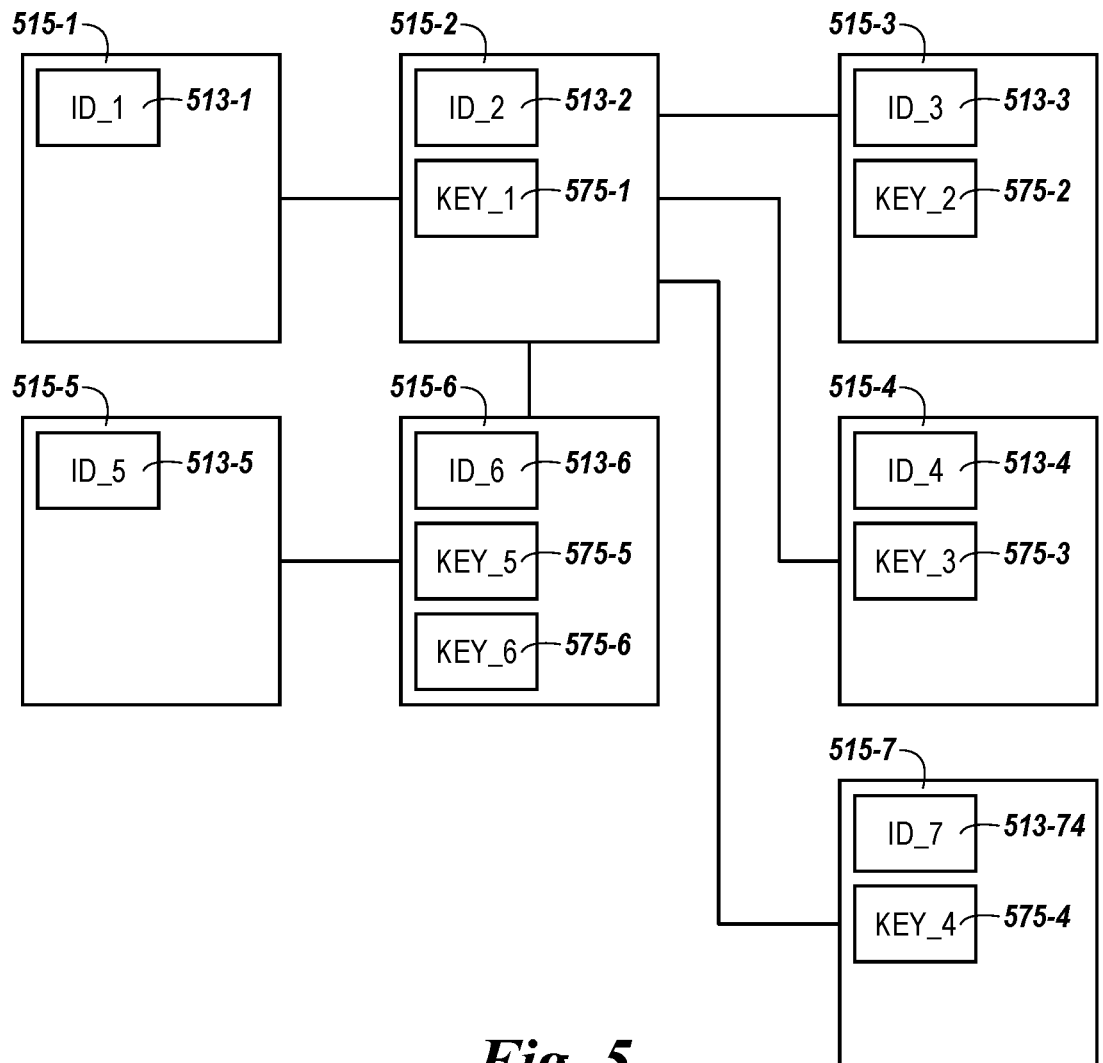
FIG. 5 illustrates an example of a database in forms of a number of tables with identifiers associated with the number of tables in accordance with an embodiment of the present disclosure.
FIG. 6A illustrates an example of a pair of registers used to define a secure memory array in accordance with an embodiment of the present disclosure.

FIG. 5 illustrates an example of a database in forms of a number of tables with identifiers associated with the number of tables in accordance with an embodiment of the present disclosure. Tables 515-1, 515-2, 515-3, 515-4, 515-5, 515-6, and/or 515-7 (collectively referred to as tables 515) can be generated, updated, and/or maintained by a particular device such as intermediary device 102.

Tables 515 can correspond to (e.g., include information corresponding to) respective categories. Example categories tables 515 correspond to can include customers (e.g., names, addresses, phone numbers, and/or customer numbers of the customers), orders (e.g., order number, order data, required data, shipped data, status, comments, customer numbers of the orders), quotes (e.g., dates of the quotes), draft (e.g., draft date), items (e.g., title and/or price of the items), order line (e.g., quantity of the orders), and/or invoice (e.g., invoice date), although embodiments are not so limited.

As illustrated in FIG. 5, each table is assigned a particular identifier. As an example, table 515-1 is assigned an identifier 513-1, table 515-2 is assigned an identifier 513-2, table 515-3 is assigned an identifier 513-3, table 515-4 is assigned an identifier 513-4, table 515-5 is assigned an identifier 513-5, table 515-6 is assigned an identifier 513-6, and table 515-7 is assigned an identifier 513-7. The identifiers 513-1, ..., 513-7 (collectively referred to as identifiers 513) can be utilized to access data stored in the tables 515 and/or locations of information corresponding to respective identifiers are stored. As an example, information of each table (e.g., tables 515) may be virtually stored within the intermediary device 102 while physical data corresponding to virtual data of the tables 515 are stored in a network, in which network devices (e.g., network device 104) are configured as nodes of the network. As an example, each table (e.g., tables 515) may include an address of each information, and the address can be utilized to locate where physical data corresponding to each information are stored (e.g., within the network).

In an example, tables 515 can be stored in various locations. In an example, tables 515 can be stored in intermediary device 402 and/or in network 410 (e.g., may be distributed over one or more nodes 410), described in connection with FIG. 4.

Each table 515 is coupled (e.g., linked) to one another. As illustrated in FIG. 5, table 515-1 is coupled to table 515-2, table 515-2 is coupled to 515-3, 515-4, 515-6, and 515-7, and table 515-5 is coupled to table 515-6. Information stored in those tables that are coupled to each other can be (e.g., sequentially) accessed using keys stored in each table. As an example, table 515-1 can be accessed from table 515-2 using key 575-1, table 515-2 can be accessed from tables 515-6, 515-3, 515-4, and 515-7 using keys 575-5, 575-2, 575-3, and 575-4, respectively, and table 515-5 can be accessed from table 515-6 using key 575-6.

Accordingly, information corresponding to multiple categories (e.g., a particular customer bought a particular product over a particular period) can be retrieved from multiple tables using keys 575 stored in tables 515. As an example, in retrieving information corresponding to categories of tables 515-1, 515-2, and 515-3, table 515-3 can be firstly accessed, table 515-2 can be subsequently accessed using key 575-2 stored in table 515-3, and table 515-1 can be subsequently accessed using key 575-1 stored in table 515-1. Similarly, in retrieving information corresponding to categories of tables 515-1, 515-2, and 525-4, table 515-4 can be firstly accessed, table 515-2 can be subsequently accessed using key 575-3 stored in table 515-4, and table 515-1 can be subsequently accessed using key 575-1 stored in table 515-1. Similarly, in retrieving information corresponding to categories of tables 515-1, 515-2, and 525-7, table 515-7 can be firstly accessed, table 515-2 can be subsequently accessed using key 575-4 stored in table 515-7, and table 515-1 can be subsequently accessed using key 575-1 stored in table 515-1. Similarly, in retrieving information corresponding to categories of tables 515-1, 515-2, and 525-6, table 515-6 can be firstly accessed, table 515-2 can be subsequently accessed using key 575-5 stored in table 515-6, and table 515-1 can be subsequently accessed using key 575-1 stored in table 515-1. Similarly, in retrieving information corresponding to categories of tables 515-5 and 515-6, table 515-6 can be firstly accessed, and table 515-5 can be subsequently accessed using key 575-5 stored in table 515-6.

Tables 515 can be maintained by a particular device/node such as intermediary device 402. In one example, the intermediary device 402 can track those information being newly added to the table 515. As an example, transactions that have newly occurred may be added to network 410, and in this example, categories corresponding to information associated with the new transactions can be determined and the information distributed to respective tables according to their determined categories. In this way, the intermediary device 402 needs not identify what categories information are subject to each time respective transactions are being added to network 410, which can provide benefits such as retrieving and providing retrieved information to requester in a timely manner.

Further details of retrieving information stored in network and/or tables in a secure manner are described in connection with FIGS. 7-11.

Figure 6B:
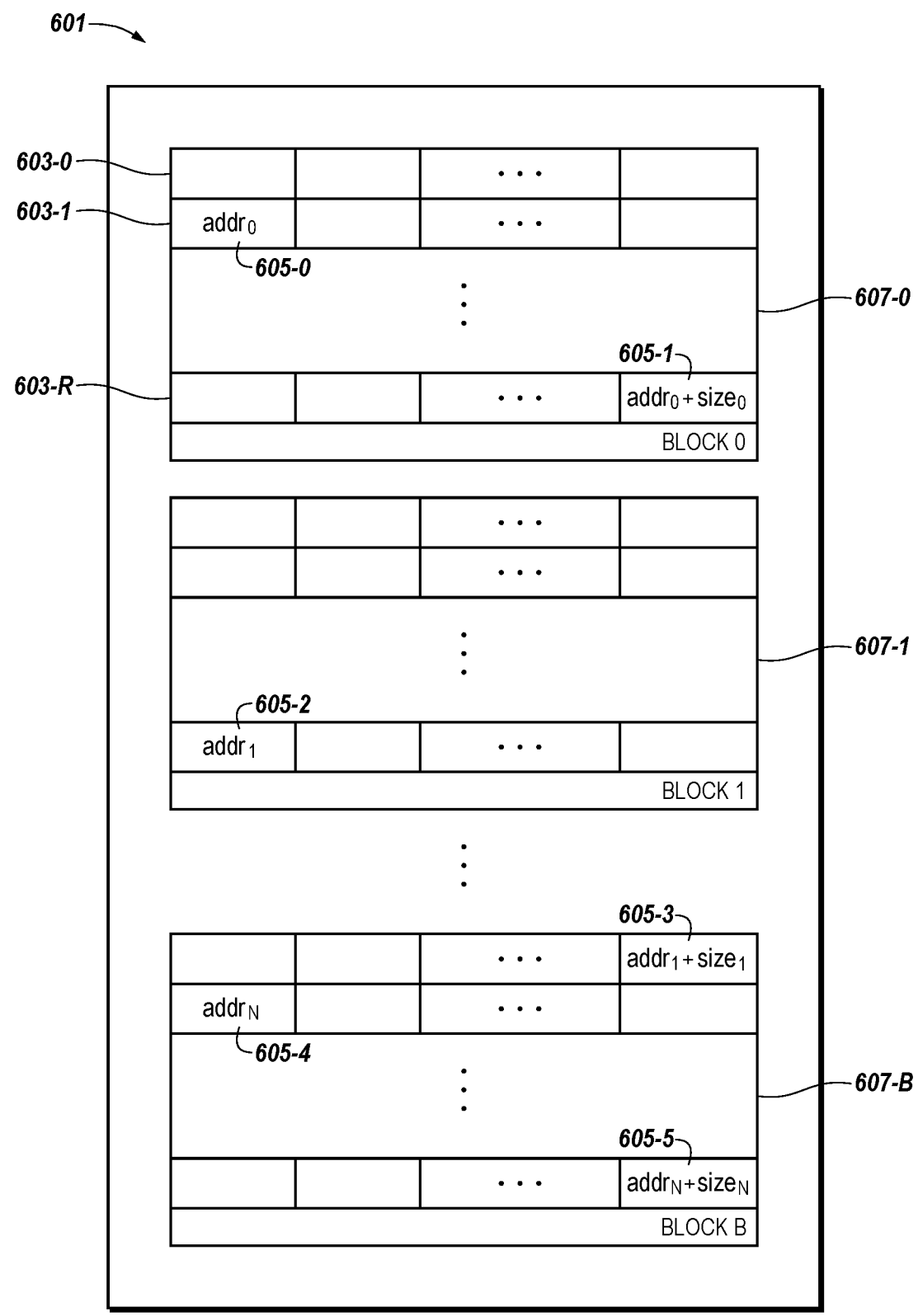
FIG. 6B illustrates a diagram of a portion of a memory array that includes a secure memory array defined in accordance with an embodiment of the present disclosure.

FIG. 6A illustrates an example of a pair of registers 614-1 and 614-2 used to define a secure memory array in accordance with an embodiment of the present disclosure, and FIG. 6B illustrates a diagram of a portion of a memory array 601 that includes a secure memory array defined using registers 614-1 and 614-2 in accordance with an embodiment of the present disclosure. Registers 614-1 and 614-2 can be, for instance, registers 314-1 and 314-2, respectively, previously described in connection with FIG. 3, and secure memory array 601 can be, for instance, memory array 301 previously described in connection with FIG. 3. For instance, as shown in FIG. 6B, secure memory array 601 can include a number of physical blocks 607-0, 607-1, . . . , 607-B of memory cells, each including a number of physical rows 603-0, 603-1, . . . , 603-R having a number of sectors of memory cells, in a manner analogous to memory array 201 previously described in connection with FIG. 2.

As shown in FIG. 6A, register 614-1 can define addresses of the secure array (e.g., the addresses of different portions of the secure array), and register 614-2 can define sizes of the secure array (e.g., the sizes of the different portions of the secure array). The addresses of the secure array defined by register 614-1 can correspond to, for instance, starting points (e.g., starting LBAs) of the secure array (e.g., the starting points of the different portions of the secure array), and the sizes of the secure array defined by register 614-2 can correspond to, for instance, ending points (e.g., ending LBAs) of the secure array (e.g., the ending points of the different portions of the secure array).

For example, as shown in FIG. 6A, registers 614-1 and 614-2 can define N pairs of values, with each respective pair comprising an address value (e.g., addr) defined by register 614-1 and a size value (e.g., size) defined by register 614-2. For instance, in the example illustrated in FIG. 6A, $Pair_0$ comprises address value $addr_0$ and size value $size_0$ (e.g., $Pair_0=[addr_0, size_0]$), $Pair_1$ comprises address value $addr_1$ and size value $size_1$ (e.g., $Pair_1=[addr_1, size_1]$), and so on, with $Pair_N$ comprising address value $addr_N$ and size value $size_N$ (e.g., $Pair_N=[addr_N, size_N]$). The address value of a pair can correspond to a starting point (e.g., starting LBA) of a portion of the secure array, and the sum of the address value and the size value of that pair can correspond to the ending point (e.g., ending LBA) of that portion of the secure array. As such, the entire secure array (e.g., the portions that comprise the entire secure array) can be given by: $[addr_0, addr_0+size_0] \cup [addr_1, addr_1+size_1]\cup . . . \cup[addr_N, addr_N+size_N]$.

The first pair whose size value defined by register 614-2 is zero can stop the definition of the secure array. For instance, in the example illustrated in FIG. 6A, if the size value of $Pair_2$ is zero, then the secure array would be given by: $[addr_0, addr_0+size_0]\cup[addr_1, addr_1+size_1]$.

An example of a secure array defined by registers 614-1 and 614-2 (e.g., with all size values defined by register 614-2 as non-zero) is illustrated in FIG. 6B. For instance, as shown in FIG. 6B, the address (e.g., LBA) associated with sector 605-0 of memory array 601 is $addr_0$, the address associated with sector 605-1 of memory array 601 is $addr_0+size_0$, the address associated with sector 605-2 of memory array 601 is $addr_1$, the address associated with sector 605-3 of memory array 601 is $addr_1+size_1$, the address associated with sector 605-4 of memory array 601 is $addr_N$, and the address associated with sector 605-5 of memory array 601 is $addr_N+size_N$. As such, the secure array comprises sectors (e.g., the data stored in sectors) 605-0 through 605-1, sectors 605-2 through 605-3, and 605-4 through 605-5. However, the sectors of memory array 601 that are before sector 605-0, and sectors 605-1 through 605-2 of memory array 601, are not part of the secure array (e.g., the secure array comprises a subset of array 601).

Figure 7:
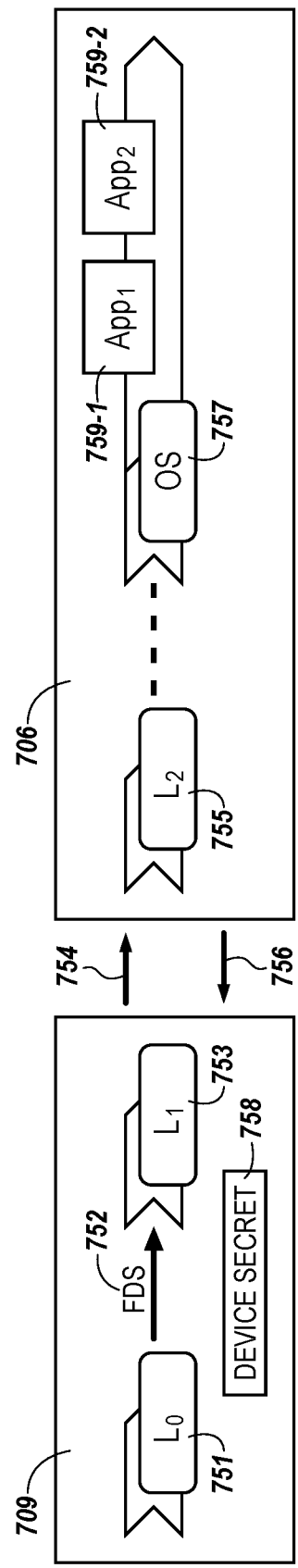
FIG. 7 is a block diagram of an example system including a host and a memory device in accordance with an embodiment of the present disclosure.

FIG. 7 is a block diagram of an example system including a host 709 and a memory device 704 in accordance with an embodiment of the present disclosure. Host 709 and memory device 704 can be, for example, intermediary device 102 and network device 104 previously described in connection with FIG. 1. As used herein, a public key, public identification, and certificate that were generated at intermediary device can be referred to as intermediary public key, intermediary public identification, and intermediary certificate, respectively. Similarly, a public key, public identification, and certificate that were generated at network device can be referred to as network public key, network public identification, and network certificate, respectively.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 7, Layer 0 ("$L_0$") 751 and Layer 1 ("$L_1$") 753 are within the host. Layer 0 751 can provide a Firmware Derivative Secret (FDS) key 752 to Layer 1 753. The FDS key 752 can describe the identity of code of Layer 1 753 and other security relevant data. In an example, a particular protocol (such as robust internet of things (RIOT) core protocol) can use the FDS 752 to validate code of Layer 1 753 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 758 can be used to create the FDS 752 and be stored in memory of the host 709.

The host can transmit data, as illustrated by arrow 754, to the memory device 704. The transmitted data can include an identification that is public, a certificate, and/or a public key. Layer 2 ("$L_2$") 755 of the memory device 704 can receive the transmitted data, and execute the data in operations of the operating system ("OS") 757 and on a first application 759-1 and a second application 759-2.

In an example operation, the host 709 can read the device secret 758, hash an identity of Layer 1 753, and perform a calculation including:

$$K_{L1}=KDF[Fs(s), Hash (\text{``immutable information''})]$$

where $K_{L1}$ is an public key, KDF (e.g., KDF defined in the National Institute of Standards and Technology (NIST) Special Publication 800-108) is a key derivation function (e.g., HMAC-SHA256), and Fs(s) is the device secret 758. FDS 752 can be determined by performing:

$$FDS=HMAC\text{-}SHA256[Fs(s),SHA256(\text{``immutable information''})]$$

Likewise, the memory device 704 can transmit data, as illustrated by arrow 756, to the host 709.

Embodiments are not limited to a particular type of entities that can communicate (e.g., transmit and receive data) as illustrated in FIG. 7. As an example, although FIG. 7 illustrates a host 709 and a memory device 704 as entities of the communication (e.g., transmission 754 and reception 756). However, such communication can be performed between other entities as well, such as between two memory device (e.g., nodes 420 of network 410).

Figure 8:
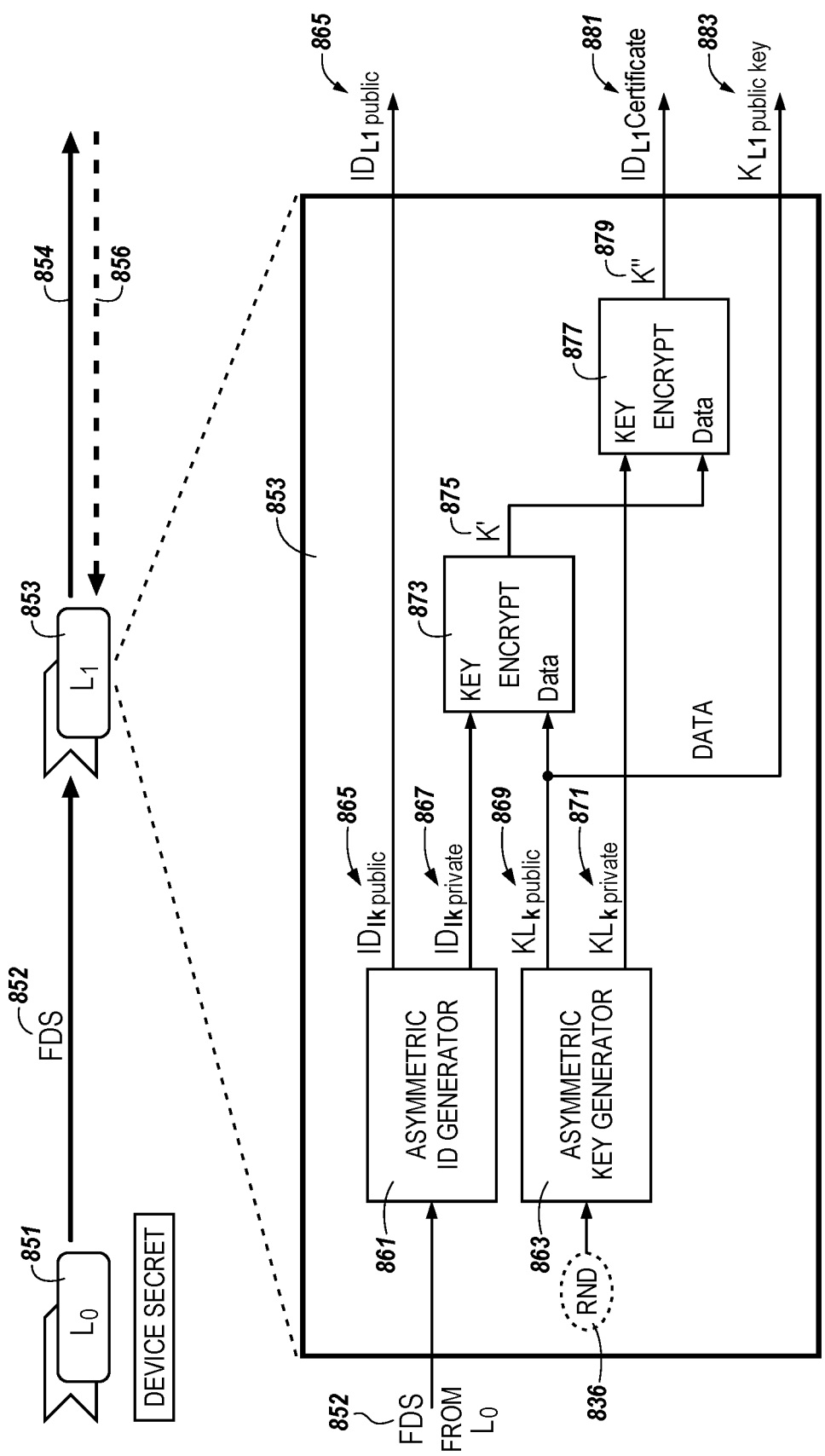
FIG. 8 is a block diagram of an example process to determine a number of parameters in accordance with an embodiment of the present disclosure.

FIG. 8 is a block diagram of an example process to determine a number of parameters in accordance with an embodiment of the present disclosure. FIG. 8 is an example of a determination of the parameters including the public identification, the certificate, and the public key that are then sent, indicated by arrow 854, to Layer 2 (e.g., Layer 2 755) of a memory device (e.g., 704 in FIG. 7). Layer 0 ("$L_0$") 851 in FIG. 8 corresponds to Layer 0 751 in FIG. 7 and likewise FDS 852 corresponds to FDS 752, Layer 1 853 corresponds to Layer 1 753, and arrows 854 and 856 correspond to arrows 754 and 756, respectively.

The FDS 852 from Layer 0 851 is sent to Layer 1 853 and used by an asymmetric ID generator 861 to generate a public identification ("$ID_{lk\ public}$") 865 and a private identification 867. In the abbreviated "$ID_{lk\ public}$," the "lk" indicates Layer k (in this example Layer 1), and the "public" indicates that the identification is openly shared. The public identification 865 is illustrated as shared by the arrow extending to the right and outside of Layer 1 853 of the host. The generated private identification 867 is used as a key input into an encryptor 873. The encryptor 873 can be any processor, computing device, etc. used to encrypt data.

Layer 1 853 of a host can include an asymmetric key generator 863. In at least one example, a random number generator (RND) 836 can optionally input a random number into the asymmetric key generator 863. The asymmetric key generator 863 can generate a public key ("$K_{Lk\ public}$") 869 and a private key ("$K_{LK\ private}$") 871 associated with a host such as host 709 in FIG. 7. The public key 869 can be an input (as "data") into the encryptor 873. The encryptor 873 can generate a result K'875 using the inputs of the private identification 867 and the public key 869. The private key 871 and the result K'875 can be input into an additional encryptor 877, resulting in output K"879. The output K"879 is the certificate ("$ID_{L1}$ certificate") 881 transmitted to the Layer 2 (755 of FIG. 7). The certificate 881 can provide an ability to verify and/or authenticate an origin of data sent from a device. As an example, data sent from the host can be associated with an identity of the host by verifying the certificate, as will be described further in association with FIG. 8. Further, the public key ("$K_{L1\ public\ key}$") 883 can be transmitted to Layer 2. Therefore, the public identification 865, the certificate 881, and the public key 883 of a host can be transmitted to Layer 2 of a memory device.

Figure 9:
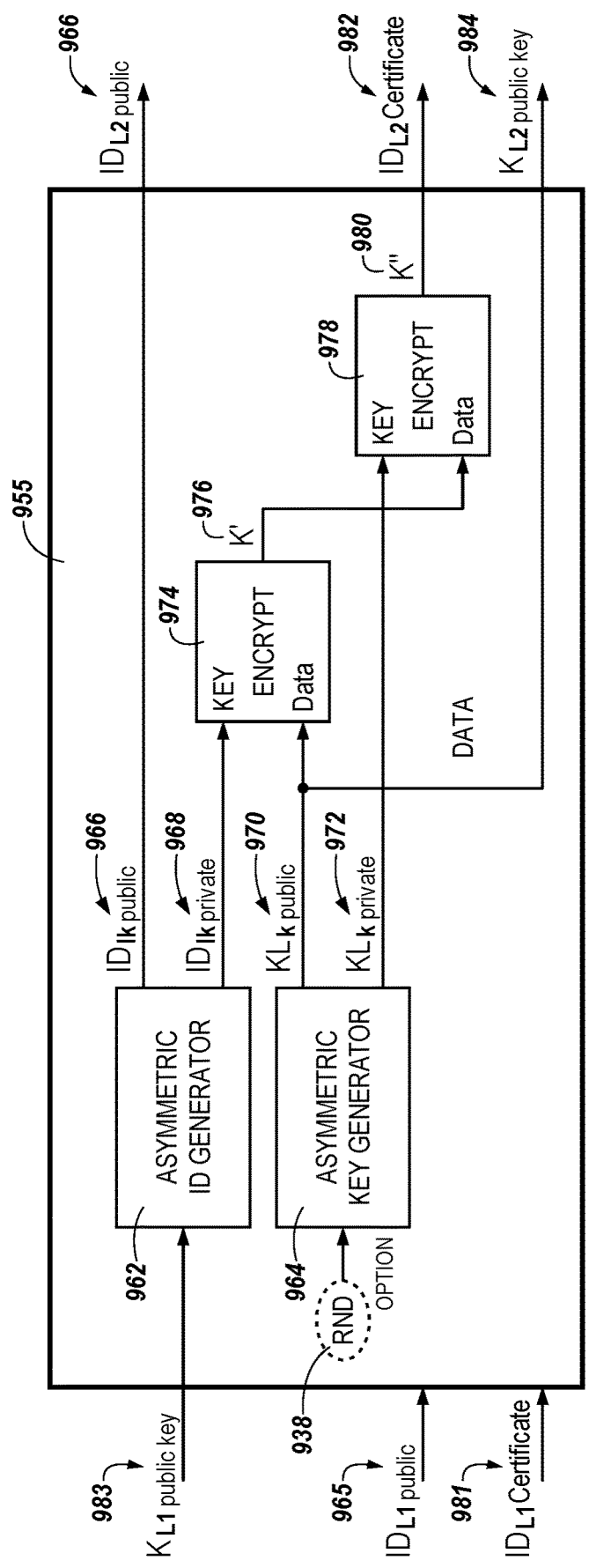
FIG. 9 is a block diagram of an example process to determine a number of parameters in accordance with an embodiment of the present disclosure.

FIG. 9 is a block diagram of an example process to determine a number of parameters in accordance with an embodiment of the present disclosure. FIG. 9 illustrates a Layer 2 955 of a memory device (e.g., memory device 704 in FIG. 7) generating a identification ("$ID_{L2}$ public") 966, a device certificate ("$ID_{L2}$ Certificate") 982, and a public key ("$K_{L2\ public\ key}$") 984.

The public key ("$K_{L1\ public\ key}$") 983 transmitted from Layer 1 of the host to Layer 2 955 of a memory device, as described in FIG. 6, is used by an asymmetric ID generator 962 of the memory device to generate a public identification ("$ID_{lk\ public}$") 966 and a private identification 968 of the memory device. In the abbreviated "$ID_{lk\ public}$," the "lk" indicates Layer k (in this example Layer 2), and the "public" indicates that the identification is openly shared. The public identification 966 is illustrated as shared by the arrow extending to the right and outside Layer 2 955. The generated private identification 968 is used as a key input into an encryptor 974.

Layer 2 955 of the memory device can include an asymmetric key generator 964. In at least one example, a random number generator (RND) 938 can optionally input a random number into the asymmetric key generator 964. The asymmetric key generator 964 can generate a public key ("$K_{Lk\ public}$") 970 (referred to as a public key) and a private key ("$K_{LK\ private}$") 972 (referred to as a private key) associated with a memory device such as memory device 704 in FIG. 7. The public key 970 can be an input (as "data") into the encryptor 974. The encryptor 974 can generate a result K'976 using the inputs of the private identification 968 and the public key 970. The private key 972 and the result K'976 can be input into an additional encryptor 978, resulting in output K"980. The output K"980 is the device certificate ("$ID_{L2}$ certificate") 982 transmitted back to the Layer 1 (753 of FIG. 7). The device certificate 982 can provide an ability to verify and/or authenticate an origin of data sent from a device. As an example, data sent from the memory device can be associated with an identity of the memory device by verifying the certificate, as will be described further in association with FIG. 10. Further, the public key ("$K_{L2\ public\ key}$") 984 can be transmitted to Layer 1. Therefore, the public identification 966, the certificate 982, and the public key 984 of the memory device can be transmitted to Layer 1 of a host.

In an example, in response to a host receiving a public key from a memory device, the host can encrypt data to be sent to the memory device using the public key. Vice versa, the memory device can encrypt data to be sent to the host using the public key. In response to the memory device receiving data encrypted using the public key, the memory device can decrypt the data using its own private key. Likewise, in response to the host receiving data encrypted using the public key, the host can decrypt the data using its own private key. As the private key is not shared with another device outside the memory device and the private key is not shared with another device outside the host, the data sent to the memory device and the host remains secure.

In an embodiment, a first entity that initially requests a handshake with a second entity may generate a first public key, a first public identification, and a first certificate based on a device secret of its own. On the other hand, the second entity that received a request to handshake may generate a second public key, a second public identification, and a second certificate based on the first public key provided by the first entity. For example, the embodiment illustrated in FIGS. 7, 8, and 9 illustrate a host (e.g., host 709) as an entity initially requesting a handshake with a memory device (e.g., memory device 704). In this embodiment, the host 709 generates a public key (e.g., public key 883), public identification (e.g., public identification 865), and a certificate (e.g., certificate 881) based on a device secret stored in itself, and the memory device generates those based on the public key provided from the host. However, embodiments are not so limited. For example, the memory device may initially request a handshake with the memory device such that the memory device generates a public key, public identification, and a certificate using its own device secret, while the host generates those based on the public key provided from the memory device.

Figure 10:
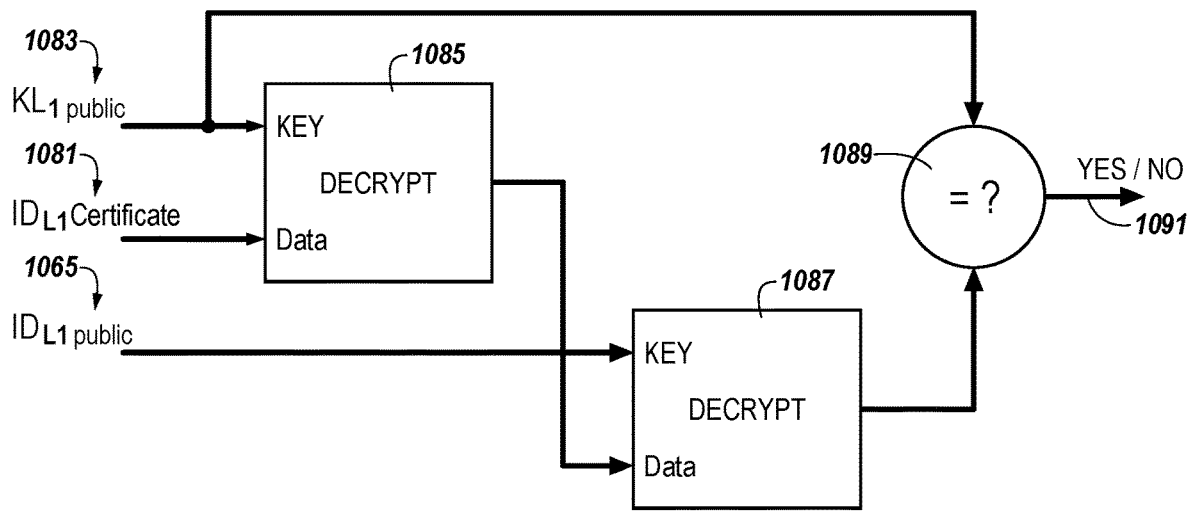
FIG. 10 is a block diagram of an example process to verify a certificate in accordance with an embodiment of the present disclosure.

FIG. 10 is a block diagram of an example process to verify a certificate in accordance with an embodiment of the present disclosure. In the illustrated example of FIG. 8, a public key 1083, a certificate 1081, and a public identification 1067 is provided from a host (e.g., from Layer 1 753 of host 709 in FIG. 7). The data of the certificate 1081 and the public key 1083 can be used as inputs into a decryptor 1085. The decryptor 1085 can be any processor, computing device, etc used to decrypt data. The result of the decryption of the certificate 1081 and the public key 1083 can be used as an input into a secondary decryptor 1087 along with the public identification, result in an output. The public key 1083 and the output from the decryptor 1087 can indicate, as illustrated at 1089, whether the certificate is verified, resulting in a yes or no 1091 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 11:
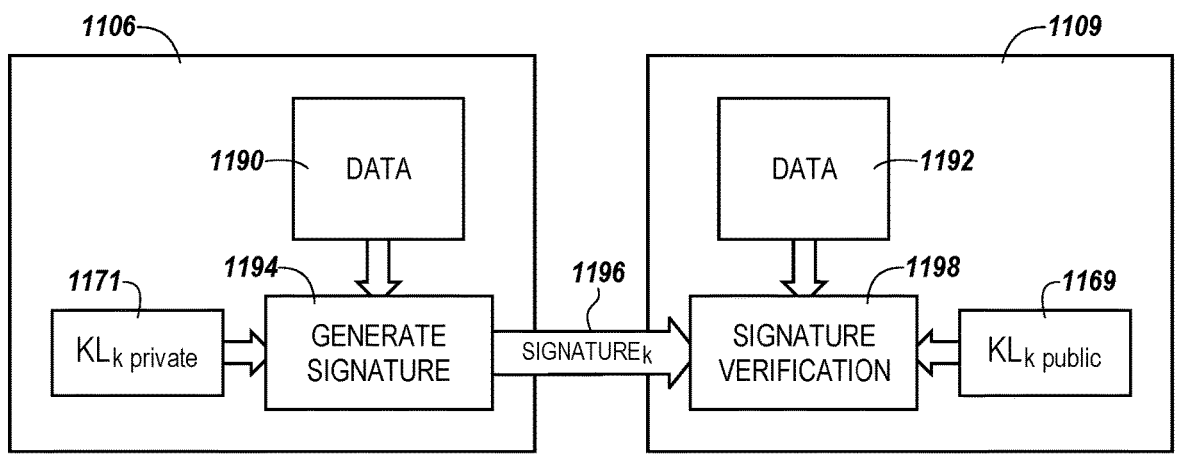
FIG. 11 is a block diagram of an example process to verify a signature in accordance with an embodiment of the present disclosure.

FIG. 11 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A memory device 1106 (such as memory device 306 in FIG. 3) can send data 1190 to a host/memory device 1109, which can be a host 102 in FIG. 1 and/or a different memory device including a global block chain 110 in FIG. 1. The memory device 1106 can generate, at 1194, a signature 1196 using a device private key 1171. The signature 1196 can be transmitted to the host/memory device 1109. The host/memory device 1109 can verify, at 1198, the signature using data 1192 and the public key 1169 previously received. In this way, the signature is generated using a private key and verified using a public key. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 12:
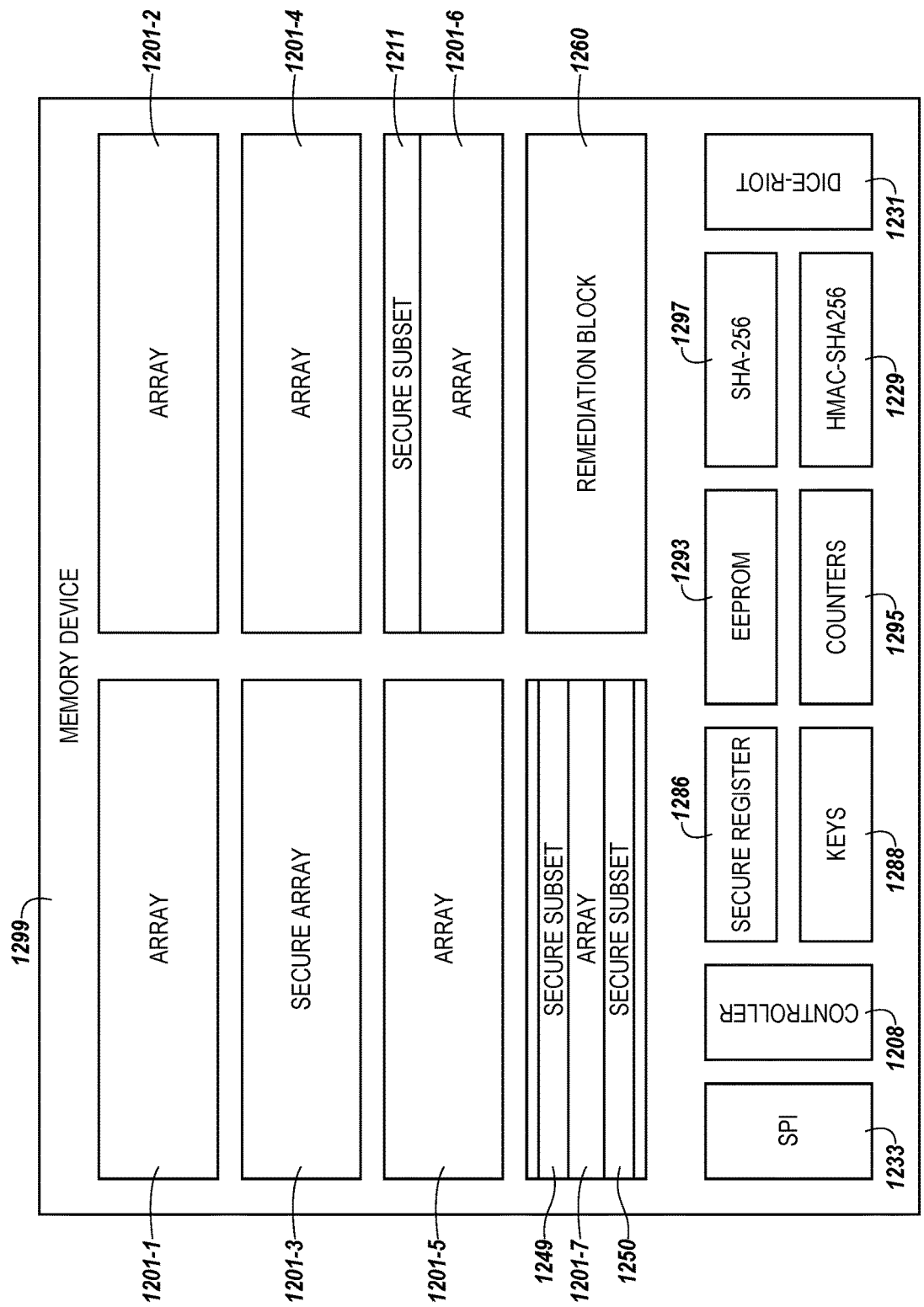
FIG. 12 is a block diagram of an example memory device in accordance with an embodiment of the present disclosure.

FIG. 12 is a block diagram of an example memory device 1299 in accordance with an embodiment of the present disclosure. Memory device 1299 can be, for example, intermediary device 102 and/or network device 104 previously described in connection with FIG. 1.

As shown in FIG. 12, memory device 1299 can include a number of memory arrays 1201-1 through 1201-7. Memory arrays 1201-1 through 1201-7 can be analogous to memory array 121 previously described in connection with FIG. 2. Further, in the example illustrated in FIG. 12, memory array 1201-3 is a secure array, subset 1211 of memory array 1201-6 comprises a secure array, and subsets 1249 and 1250 of memory array 1201-7 comprise a secure array. Subsets 1211, 1249, and 1250 can each include, for instance, 4 kilobytes of data. However, embodiments of the present disclosure are not limited to a particular number or arrangement of memory arrays or secure arrays.

As shown in FIG. 12, memory device 1299 can include a remediation (e.g., recovery) block 1260. Remediation block 1260 can be used as a source of data in case of errors (e.g., mismatches) that may occur during operation of memory device 1299. Remediation block 1260 may be outside of the area of memory device 1299 that is addressable by a host.

As shown in FIG. 12, memory device 1299 can include a serial peripheral interface (SPI) 1233 and a controller 1208. Memory device 1299 can use SPI 1233 and controller 1208 to communicate with a host and memory arrays 1201-1 through 1201-7, as previously described herein (e.g., in connection with FIG. 3).

As shown in FIG. 12, memory device 1299 can include a secure register 1286 for managing the security of memory device 1299. For example, secure register 1286 can configure, and communicate externally, to an application controller. Further, secure register 1286 may be modifiable by an authentication command.

As shown in FIG. 12, memory device 1299 can include keys 1288. For instance, memory device 1299 can include eight different slots to store keys such as root keys, DICE-RIOT keys, and/or other external session keys.

As shown in FIG. 12, memory device 1299 can include an electronically erasable programmable read-only memory (EEPROM) 1293. EEPROM 1293 can provide a secure non-volatile area available for a host, in which individual bytes of data can be erased and programmed.

As shown in FIG. 12, memory device 1299 can include counters (e.g., monotonic counters) 1295. Counters 1295 can be used as an anti-replay mechanism (e.g., freshness generator) for commands (e.g., to sign a command set or sequence) received from and/or sent to a host. For instance, memory device 1299 can include six different monotonic counters, two of which may be used by memory device 1299 for the authenticated commands, and four of which may be used by the host.

As shown in FIG. 12, memory device 1299 can include an SHA-256 cryptographic hash function 1297, and/or an HMAC-SHA256 cryptographic hash function 1229. SHA-256 and/or HMAC-SHA256 cryptographic hash functions 1297 and 1229 can be used by memory device 1299 to generate cryptographic hashes, such as, for instance, the cryptographic hashes of block 220 previously described herein, and/or a golden hash used to validate the data stored in memory arrays 1201-1 through 1201-7 as previously described herein. Further, memory device 1299 can support L0 and L1 of DICE-RIOT 1231.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
circuitry configured to:
determine, in response to receipt of a request from another device for information corresponding to one or more categories, one or more identifiers that are to identify the one or more categories the requested information stored in a network device is subject to, wherein one identifier of the one or more identifiers is to access information associated with another identifier of the one or more identifiers, and wherein the determination is based on a database comprising a plurality of tables each corresponding to a respective one of the one or more categories;
encrypt the determined identifiers using a network public key generated at a network device; and
provide, along with a signature, the determined and encrypted identifiers to the network device to retrieve, in response to the signature being verified and the one or more identifiers being decrypted at the network device, the requested information from a network in which the network device is configured as a node.

2. The apparatus of claim 1, wherein the circuitry is configured to:
generate a private key; and
generate the signature using the private key.

3. The apparatus of claim 2, wherein the apparatus comprises an asymmetric key generator, and the circuitry is configured to control the asymmetric key generator to generate the private key based on a passcode input into the asymmetric key generator.

4. The apparatus of claim 3, wherein the passcode is a random number.

5. The apparatus of claim 1, wherein the requested information includes at least one of:
a vehicle identification number (VIN);
a license plate combination;
a public key associated with a respective vehicle;
a public identification associated with the respective vehicle; and
a certificate received associated with the respective vehicle.

6. A method, comprising:
in response to receiving a request from another device for information corresponding to a plurality of categories, determining, based on a database maintained by an intermediary device, respective identifiers that are to identify the plurality of categories the requested information is subject to, wherein one identifier of the respective identifiers is to access information associated with another identifier of the respective identifiers, wherein the database comprises a plurality of tables each corresponding to a respective one of the plurality of categories;
encrypting the determined identifiers using a network public key generated at one or more network devices; and
providing, along with an intermediary signature, the determined and encrypted identifiers to a network device to retrieve, from the network device, the information identifiable based on the identifiers being decrypted at the network device, wherein the one or more network devices are configured as respective nodes of the network.

7. The method of claim 6, wherein the method further comprises, in response to receiving information that have not been previously added to the network:
determining an identifier associated with a particular category the received information corresponds to; and
generating a data packet comprising the received information along with the determined identifier such that the received information is identifiable based on the determined identifier.

8. The method of claim 6, wherein the method further comprises maintaining the database by:
updating a respective table of the plurality of tables in response to an occurrence of an event to be recorded as particular information to the database.

9. The method of claim 6, wherein the method further comprises updating the database in response to a power-on of the intermediary device.

10. The method of claim 6, wherein:
the plurality of tables comprises a first table and a second table having an access key associated with the first table; and
the method further comprises accessing, from the first table, data stored in the second table using the access key stored in the first table.

* * * * *